United States Patent [19]

Kalmanash

[11] 4,356,435
[45] Oct. 26, 1982

[54] RANDOM COLOR SWITCH FOR BEAM PENETRATION CRT

[75] Inventor: Michael H. Kalmanash, Fairfield, Conn.

[73] Assignee: United Technologies Corporation, Hartford, Conn.

[21] Appl. No.: 259,342

[22] Filed: May 1, 1981

[51] Int. Cl.³ ............................................. H01J 29/80
[52] U.S. Cl. ...................................... 315/375; 358/73
[58] Field of Search ..................... 315/375; 358/72, 73

[56] References Cited

U.S. PATENT DOCUMENTS

| | | |
|---|---|---|
| 3,492,416 | 1/1970 | Weber . |
| 3,863,097 | 1/1975 | Labudda . |
| 3,887,838 | 6/1975 | Thurston . |
| 3,906,333 | 9/1975 | Kalmanash .......................... 315/411 |
| 3,914,617 | 10/1975 | Corbel ..................................... 358/73 |
| 4,092,566 | 5/1978 | Chambers et al. ..................... 358/73 |
| 4,104,564 | 8/1978 | Cohen et al. |
| 4,151,444 | 4/1979 | Jenness . |
| 4,281,272 | 7/1981 | Spilsbury .............................. 358/73 |

Primary Examiner—Theodore M. Blum
Attorney, Agent, or Firm—Richard P. Lange

[57] ABSTRACT

A color switch for a beam penetration CRT includes a return path through a pair of reverse biased diodes to recapture a substantial amount of the energy associated with changing the voltage on the anode of the CRT for a write period in a non-baseline color. A driver circuit, which includes the low voltage power supply, is connected through a switch to one end of the primary winding of a transformer. The primary winding is also connected through one of two diodes to each half of the low voltage power supply for the driver. By opening the switch at the end of a color write period in a non-baseline color, the rapid decrease in the current through the primary winding of the transformer to restore DC balance of the magnetizing current in the transformer core forms a reverse voltage which is returned to the low voltage power supply through the diodes. The baseline color is selected to be in an intermediate range so that the anode voltage level can be swung in either direction so that a random non-baseline color can be selected for a color write period.

6 Claims, 2 Drawing Figures

RANDOM COLOR SWITCH FOR BEAM PENETRATION CRT

DESCRIPTION

Technical Field

This invention relates to a switching high voltage power supply, and more particularly, to an inexpensive, fast, high voltage power supply which is well suited to addressing non-baseline colors up to a maximum write period.

BACKGROUND ART

A beam penetration-type color CRT (cathode-ray tube) is generally known and is a display device having a faceplate on which an image or alphanumeric characters can be written. One or more phosphor layers on the inner surface of the faceplate can be selected to emit almost any desired wavelength of visible light. If two layers of phosphor are deposited on the faceplate, it is possible to display more than two distinct colors by changing the depth of penetration of the electron beam into the phosphor layers. Because the electron beam emitted by the cathode in the neck of the CRT stikes the phosphor layers at a velocity influenced primarily by the voltage level on the accelerating anode, a change in the voltage level applied to the accelerating anode will correspondingly change the proportion of light emitted by the two phosphor layers. In other words, in a penetration CRT with two layers of different light emitting phosphor up to about four colors can be displayed to a viewer by changing the DC voltage level applied to the accelerating anode positioned near the front of the CRT.

A significant limitation encountered in the use of penetration-type CRT's is related to the length of the reset period between write periods. Because the DC voltage level on the accelerating anode must be changed during the reset period, the length of the reset period is primarily defined by the electrical capacitance associated with the anode. The anode has a relatively large physical size and, as such, inherently has a large capacitance resulting in a significant amount of electrical charge being stored thereon during a write period. Of course, any additional capacitors, particularly large capacitors which are often used in high voltage power supplies, also increase the capacitance in the high voltage circuit and add to the reset period. Because this electrical charge is increased, or decreased, to change the voltage level on the anode, the reset period separating two write periods is related to the charge/discharge rate inherently associated with the total capacitance seen by the high voltage power supply.

Another limitation found in prior art color switches used with beam penetration CRT's is related to the sequencing of the colors to be displayed on the CRT faceplate. Although it is possible to display between three or four distinguishable colors on a two-layer penetration CRT, some high voltage color switches must operate in a particular sequence. In other words, the high voltage color switch provides one preselected voltage level to the anode in successive write periods, that is, the anode voltage is changed from 10 KV to 14 KV, from 14 KV to 18 KV and finally from 18 KV back to 10 KV. During each of these sequential write periods, images or alphanumerics written by the electron beam are displayed only in that color corresponding to the voltage level impressed on the anode. If images or alphanumerics are to be displayed in one color, such as red, during a particular write period, then at the completion of that write period no additional red information can be displayed until the high voltage color switch sequences through its preselected voltage levels to the next write period at which red information can be displayed.

Of particular interest is U.S. Pat. No. 3,906,333 issued Sept. 16, 1975 to M. Kalmanash for LOW COST SWITCHING HIGH VOLTAGE SUPPLY, assigned to the same assignee as the present case, which describes a switching high voltage power supply for use with a beam penetration-type cathode-ray tube. This power supply has the secondary of a high voltage step-up transformer in series with the accelerating anode of the cathode-ray tube. The primary of the transformer is connected to ground through a capacitor for developing a DC voltage level. This voltage across the capacitor is fed to the regulating input of the baseline DC high voltage power supply. The color switching power supply of the present invention is an improvement over that described in this patent.

Another patent of interest is U.S. Pat. No. 4,092,556 issued May 30, 1978 to D. Chambers et al for SWITCHED HIGH VOLTAGE POWER SUPPLY SYSTEM. This patent describes a high voltage power supply for the rapid switching of high voltage applied to the anode of a beam penetration color cathode-ray tube. The energy for making the rapid transition between voltage levels is stored in two inductors, one for upward transitions and the other for downward transitions. When it is desired to change the voltage applied to the cathode-ray tube, the appropriate one of the storage inductors is coupled through a control switch to the anode causing the voltage applied to the anode to change at a rapid rate. The voltage rises until the desired voltage level corresponding to a desired upward color is reached at which time the switch is turned off and the storage inductor recharged. A tracking high voltage supply maintains the anode at the predetermined voltage level once that level has been reached.

DISCLOSURE OF THE INVENTION

It is an object of the present invention to provide a color switch for a beam penetration CRT which is capable of fully random operation such that non-baseline color can be displayed on the CRT during a write period of a preselected time.

A particular feature of the random sequential color switch for a beam penetration CRT according to the present invention is that the secondary circuit of a high voltage transformer includes no capacitors which must be charged or discharged to change the voltage level on the accelerating anode.

According to the present invention, a random color switch for a beam penetration CRT includes a high voltage power supply having an output voltage level set to conform to an intermediate or baseline color, i.e., 14 KV in a range of 10 KV to 18 KV. The high voltage power supply is connected through a high voltage transformer secondary winding to the accelerating anode of the penetration CRT. The high voltage transformer primary winding receives pulses which, through the transformer, add to, or subtract from, the 14 KV voltage level of the high voltage power supplies, thus varying the accelerating voltage level and hence the color displayed by the CRT. The characteristics of the high voltage transformer are matched to the maximum write time at one of the extreme voltage levels so as to avoid core saturation. The primary or low voltage portion of the circuit includes a low voltage power supply which supplies both a positive and a negative voltage level to a driver unit. Each half of the power supply is also coupled to the primary winding of the high voltage transformer through a reverse biased diode. The output of the driver is connected through a switch to the primary winding of the high voltage transformer. At the end of a write period for which the voltage level of the CRT anode is set to a non-baseline color, the switch is opened, interrupting the current through the primary winding. With the rapid decrease in the current through the primary winding of the transformer, a large reverse voltage is generated in the primary circuit by the transformer and this current pulse is returned to the low voltage power supply through one of the two diodes. Thus, by this process, energy is conserved and the voltage level on the accelerating anode of the CRT is returned to its baseline voltage.

A particular feature of the random color switch for a beam penetration tube according to the present invention is that the current in the primary circuit of a transformer which is used to change the high voltage DC level presented to an accelerating anode of a CRT is almost completely returned to the low voltage power supply during the reset interval. In other words, rather than dissipate some of the energy required to change the voltage level from its baseline potential, a substantial amount of the energy associated with the pulses in the primary winding is returned during the reset interval to the low voltage power supply. This allows the use of a color switch which is both smaller in size and also consumes less energy than prior color switches.

The foregoing and other objects, features and advantages of the present invention will become more apparent from the following description of preferred embodiments and accompanying drawings.

BEST MODE FOR CARRYING OUT THE INVENTION

Figure 1:
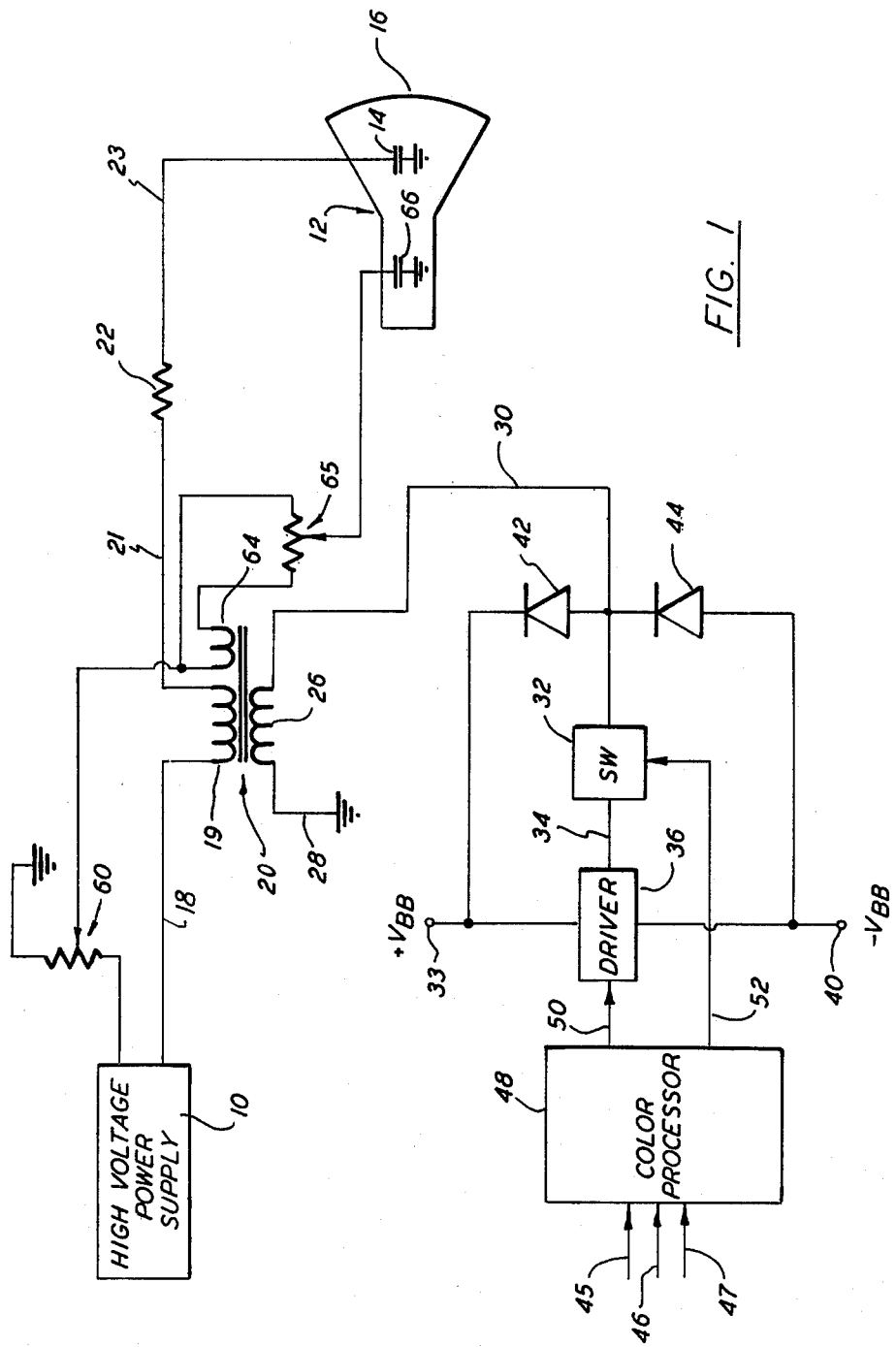
FIG. 1 is a schematic diagram in block form depicting one embodiment of the random color switch for a beam penetration CRT according to the present invention.

Referring initially to FIG. 1, there is seen one embodiment of the random color switch for a beam penetration tube employing a diode control energy return path according to the present invention. In preferred form, a high voltage power supply 10 of a known type is provided and its DC output voltage level is selected to provide a predetermined baseline color (described in greater detail hereinafter) in a beam penetration CRT (cathode-ray tube) 12. As is known, the CRT 12 includes an anode 14 to which a high voltage is applied causing the beam of electrons emitted by a cathode (not shown) located in the tube nect to accelerate toward the faceplate 16 located across the front of the tube. The inner surface of the faceplate 16 typically has at least two layers of phosphor deposited thereon, each layer emitting a distinct wavelength or color of light in response to being excited by the electron beam. For the purposes of appreciating the present invention, it will be assumed that there is one layer of green phosphor and one layer of red phosphor on the inner surface of the faceplate 16, but it should be understood that phosphors which emit different colors could be used. Of course, more than two layers of phosphor could be deposited on the faceplate if more displayed colors are desirable. The anode 24 is formed from material of high conductivity and is positioned circumferentially around the front portion of the tube near the faceplate 16. Because of its large size, the anode 24 has a relatively high capacitance, but, for the purposes of simplicity, is illustrated in the preferred embodiment of FIG. 1 as a capacitor.

In accordance with the present invention, the output of the high voltage power supply 10 is presented along a line 18 to one end of a secondary winding 19 of a transformer 20. The other end of the secondary winding 19 is connected by a lead 21 to one end of a damping resistor 22. The other end of the damping resistor 22 is connected on by a lead 23 to the anode 14 of the CRT 12. As will be appreciated, the just-described circuit is essentially a high voltage circuit operating in the range of, for example, 10 KV to 18 KV to provide the voltage levels suitable for driving the anode 14. The baseline color in the present embodiment is obtained by impressing 14 KV on the anode 14 and, because of the red and green phosphors, would be a mix of the two colors, or approximately orange.

The transformer 20 also has a primary winding 26 that has a preselected turn ratio with respect to the secondary winding 19 to form the needed voltage swing in the known manner. For example, if a 1 to 1,000 turns ratio were employed in the transformer 20, a 4 V change across the primary winding 26 would result in a 4 KV change across the secondary winding 19. This voltage swing, if symmetric about ground potential, would result in a voltage swing of the secondary winding 19 from $-2$ KV to $+2$ KV, all this being well known to those of ordinary skill. In the present embodiment, one end of the primary winding 26 is connected by a lead 28 to ground. The other side of the primary winding 26 is connected by a line 30 to the output of switch 32. The input to the switch 32 is connected via a line 34 to the output of a driver 36, such as an operational amplifier or the like. The driver 36 is powered by a low voltage power supply (not shown) of a known type in a conventional manner through a terminal 38, which has a positive voltage applied thereto, and a terminal 40 which has a negative voltage level applied thereto. Typical voltages applied to the terminals 38 and 40 would be in the range of $+25$ V DC to $-25$ V DC, respectively.

A particular feature of the present invention involves a feedback path from the transformer 20 to a low voltage power supply through which energy is returned during the reset period. This path includes a pair of diodes 42 and 44 which are connected in a reverse bias configuration between the line 30 and each half of the low voltage power supply. In other words, the anode of the diode 42 is connected to the line 30 while the cathode of the diode 42 is connected to the terminal 38 and the positive half of the low voltage power supply. In a similar fashion, the cathode of the diode 44 is connected to the line 30 while the anode is connected to the terminal 40 and the negative portion of the low voltage power supply.

Incoming color information is presented to the random color switch of the present invention on lines 46 and 47 from an external source (not shown). Although there are numerous types of external sources capable of providing such information, in a typical case this information might come from a larger, more comprehensive control circuit for the display system. The details of such an external source play no part in appreciating the significance of the present invention. However, for the purpose of simplicity the inputs to the color processor 48 are assumed to be a color select binary digital signal which is capable of indicating which one of four colors is to be displayed on the CRT 16, plus an enable digital signal which initiates the color switch response. The digital signals on the lines 45, 46 and 47 are presented to a color processor 48. The output from the color processor is then presented via a line 50 to the driver 36. During the reset period the switch 32 must be opened and a control signal is presented from the color processor 48 on the line 52 to the switch 32 which disables it during the reset period.

A particular feature of the present invention is that it also provides dynamic tracking color focus voltage for the CRT 22. In preferred form this includes a first potentiometer 60 which is coupled to the output of the high voltage power supply 10. This is a separate output which has a lower DC level than the output used to supply the anode voltage. The first potentiometer 60 is connected through a winding 62 which is an additional winding on the transformer 16 to a second potentiometer 64. The potentiometer 64 is used to provide dynamic adjustment to the voltage applied to the focus electrode 66 which is located near the front portion of the electron gun (not shown). Typically, the focus voltage level applied to the focus electrode is a fixed percentage level of the voltage applied to the anode 24. A particular feature of the present invention is that this focus system requires a minimum of additional parts, only a couple of potentiometers and the additional winding on the transformer 16. The first potentiometer 60 adjusts the DC baseline voltage level while the second potentiometer 64 adjusts the dynamic output to the level applied to the focus electrode 66.

Figure 2:
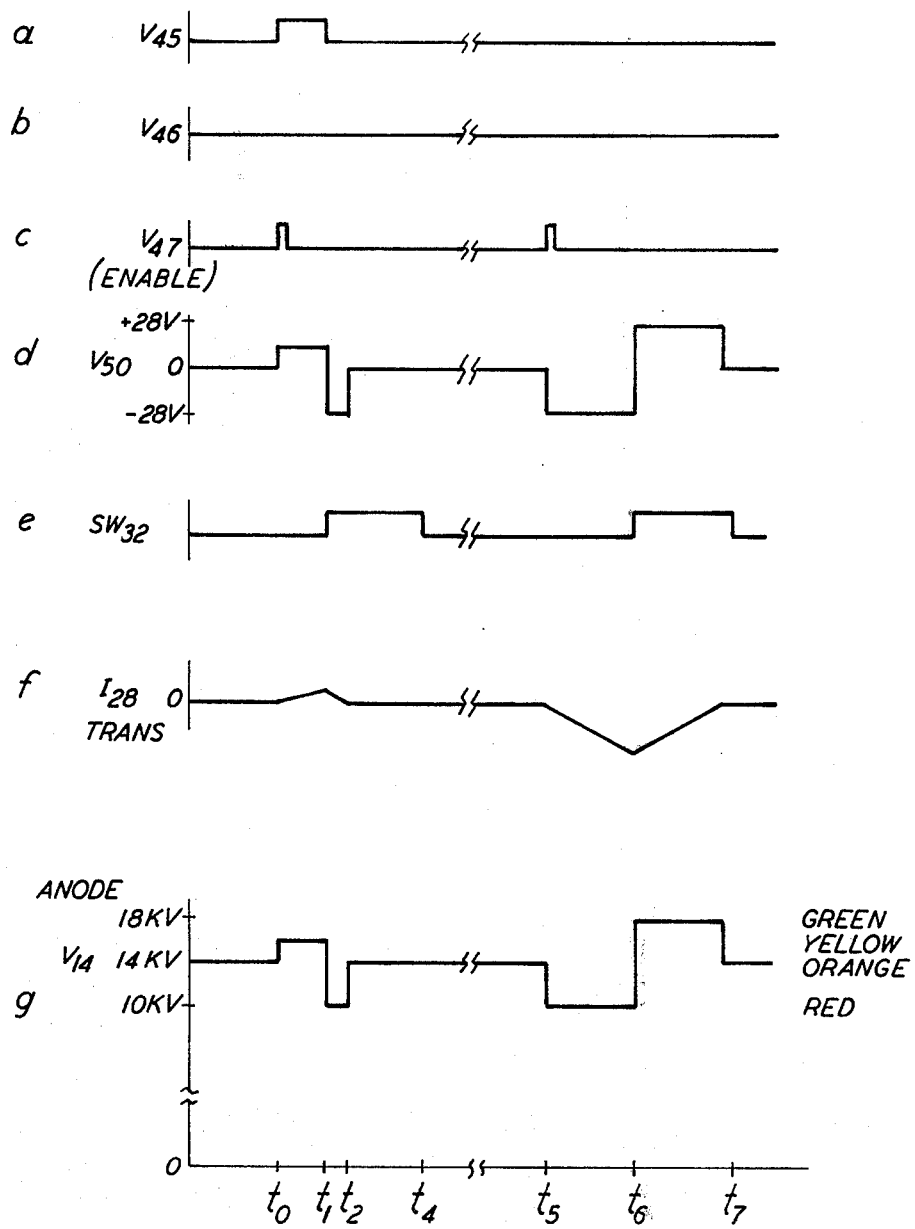
FIG. 2 is a diagram depicting waveforms at various points in the embodiment of FIG. 1.

Referring now to FIG. 2 the operation of the random color switch according to the present invention will now be described as it is cycled first through a yellow write period and then through a red write period. As briefly mentioned hereinbefore, the embodiment of the present invention is well suited to a situation where the baseline color, here being orange, is to be used to display information on the faceplate 16 of the cathode-ray tube 12 during the majority of the time. An example of this would be radar displays, airborne cockpit displays, aircraft multifunction displays, etc. However, at certain times, e.g., to highlight a particular item on the screen such as an aircraft, it may be desirable to display just that image in, for example, green or red. The color switch of the present invention then switches the voltage level on the anode 14 for a predetermined period, known as a write period, during which the information can be written on the faceplate. As will be appreciated, depending on the specific phosphors employed on the CRT, a write period can be generated to display, for example, green information, yellow information, or red information. In the present embodiment the baseline color, orange, is that color displayed on the CRT most of the time and corresponds to a voltage level setting on the anode 14 of approximately 14 KV. As mentioned, this is the DC voltage level output from the high voltage power supply 10 that is presented through the secondary winding 19 of the high voltage transformer 20 to the anode 14.

Referring first to the left-hand side of FIG. 2, there is seen a sequencing of the random color switch of the present invention during which a write period for yellow, i.e., approximately 16 KV on the accelerating anode 14, is formed. At time $t_0$ the enable signal from the external source initiates the yellow write period during which the switch 32 remains closed (FIG. 2e) and the voltage pulse from the driver 36 is stepped through the high voltage transformer 20 to be combined with the baseline voltage, 14 KV, out of the high voltage power supply 10. The color is determined by the status of the color select signal when the enable signal is activated. The current in the primary winding increases throughout the color write period until the time $t_1$ when the reset period is initiated.

A particular feature of the preferred embodiment of the random color switch according to the present invention is that during the reset period when the voltage level on the accelerating anode is restored to its baseline level, the magnetic energy dynamically stored in the transformer 20 is returned through the diode controlled feedback path to the low voltage power supply. Still referring to the left portion of FIG. 2, at time $t_1$ a control signal from the color processor 48 opens the switch 32 which interrupts the current flow from the driver 36 to the primary winding 26 of the transformer 20. The magnetic field in the transformer 20 begins to collapse creating, if unchecked, a significant voltage level. One of the diodes, depending on the polarity of the primary current, begins to conduct. A feedback path is then formed through the conducting diode to the low voltage power supply. By time $t_2$ the magnetizing current in the transformer 20 has been fully extinguished so that finally by time $t_4$, at the end of the reset period, the switch 32 is enable, closing the path from the driver circuit 36 to the secondary winding 26. The voltage level on the accelerating anode 14 has now been returned to the 14 KV level of the baseline color orange.

In utilizing the benefits of the present invention, the characteristics of the transformer 20 must be matched to the maximum write period that the switch may dwell in any one non-baseline color. This is because the voltage applied by the driver 36 to the primary winding 26 creates a magnetizing current that inherently increases the core flux density. If the peak flux density were permitted to reach the saturation level of the transformer, the resulting saturation would cause a droop in the level of high voltage applied to the anode 14 and a corresponding change in the color displayed on the faceplate of the CRT. As will be appreciated by those of ordinary skill, to increase the length of a write period a larger transformer with a higher saturation level for a given current must be used. Correspondingly, if a write period for a given color can be shorter, a smaller transformer can be used making the driver circuit smaller and more compact.

Referring now to the right-hand side of FIG. 2, there is seen an example of the situation where the anode 14 is pulsed to an extreme position, 10 KV, for a red write period. At time $t_5$ the enable input to the color processor causes it to generate a pulse to the driver 36. The driver 36 then forms a corresponding pulse in the primary circuit which forms a magnetizing current in the primary winding 26. By time $t_6$ the write period for the color red has reached its maximum interval and the flux density in the transformer 20 is approaching its saturation point. The reset interval begins with the opening of the switch 32 by a signal from the color processor 48. This allows the magnetic current to discharge through the diode 42 to the low voltage power supply. And finally, at time $t_7$, when the voltage level corresponding to the baseline color has been reached, the switch 32 is enabled closing the path from the output of the driver 36 to the secondary winding 26.

Although this invention has been shown and described with respect to a preferred embodiment, it will be understood by those skilled in this art that various changes in form and detail thereof may be made without departing from the spirit and scope of the claimed invention.

I claim:

1. A high voltage color switch for a beam penetration cathode-ray tube in which a baseline color is normally displayed but can be switched for a color write period to a randomly selected color, comprising:
   high voltage power supply means connectable to said cathode-ray tube and having an output voltage level selected to provide said baseline color when presented to said cathode-ray tube;
   transformer means connected between the output of said high voltage power supply means and said beam penetration cathode-ray tube;
   driver means for amplifying an input waveform identifying a randomly selected color to be displayed in a color write period, said driver means including a low voltage power supply;
   switch means having an open position and a closed position connected between the output of said driver means and said transformer means;
   diode means connected between said transformer means and said low voltage power supply of said driver means; and
   whereby at the end of said color write period during which a randomly selected color is displayed by said cathode-ray tube, said switch means is transitioned to its open position for a predetermined period of time allowing energy stored in said transformer means to be returned through said diode means to said low voltage power supply of said driver means.

2. A high voltage color switch according to claim 1, wherein said transformer means includes a transformer which has a primary winding and secondary winding, and wherein said primary winding is coupled between said switch means and ground, and wherein said low voltage power supply of said driver means includes a positive portion and a negative portion, and wherein said diode means includes a pair of diodes, each of which is connected between one of said portions of said low voltage power supply in a reverse biased configuration.

3. A high voltage color switch according to claim 1, wherein said cathode-ray tube includes a focus electrode to which a DC high voltage is applied to focus the electron beam, and wherein said high voltage color switch further includes a means for providing a focus voltage that tracks the high voltage DC level applied to said anode of said cathode-ray tube.

4. A high voltage color switch according to claim 3, wherein said means for providing a focus voltage includes a focus voltage winding on said transformer means connected between said high voltage power supply and said focus electrode of said CRT.

5. A high voltage color switch according to claim 4, wherein said means for providing a focus voltage includes a first potentiometer connected between said high voltage power supply and said focus winding of said transformer means for proportionally adjusting the voltage level from said high voltage power supply.

6. A high voltage color switch according to claim 5, wherein said means for adjusting the focus voltage further includes a second potentiometer coupled across the focus winding of said transformer means to proportionally adjust the voltage swing applied to said focus electrode.

* * * * *